(No Model.)

C. E. BURBANK.
NOSE BAG.

No. 558,350. Patented Apr. 14, 1896.

WITNESSES:

INVENTOR
C. E. Burbank.
BY
Munn & Co.
ATTORNEYS.

UNITED STATES PATENT OFFICE.

CLEMENT E. BURBANK, OF NEW YORK, N. Y.

NOSE-BAG.

SPECIFICATION forming part of Letters Patent No. 558,350, dated April 14, 1896.

Application filed May 1, 1895. Serial No. 547,800. (No model.)

*To all whom it may concern:*

Be it known that I, CLEMENT E. BURBANK, of New York city, in the county and State of New York, have invented certain new and useful Improvements in Nose-Bags, of which the following is a full, clear, and exact description.

This invention relates to certain improvements in nose or feed bags for horses, and has for its object to provide a device of this character of a novel and inexpensive construction which shall be adapted to be so applied to the head of the horse for use that the horse will be prevented from throwing the feed out of the bag by tossing his head.

The invention consists in a nose-bag of peculiar construction having extensions at opposite sides of its rear upper edge provided with pockets to receive draw-strings or cords, which are so secured to the breast-collar or other harness that when the horse tosses his head said draw-strings or cords will be placed under tension and will cause said extensions to contract and bind under the horse's head, so as to prevent the feed from spilling or being thrown out of the nose-bag around the head of the horse.

The invention also contemplates certain novel features of construction and combinations of parts, whereby certain other advantages are attained, all as will be hereinafter fully set forth.

The novel features of the invention will be carefully defined in the claims.

Reference is to be had to the accompanying drawings, forming a part of this specification, in which similar characters of reference indicate corresponding parts in all the figures.

Figure 1:
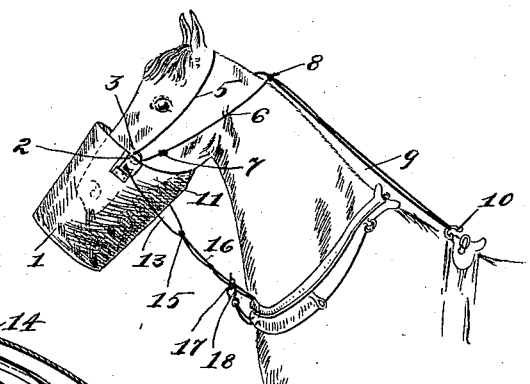
Figure 3:
Figure 2:
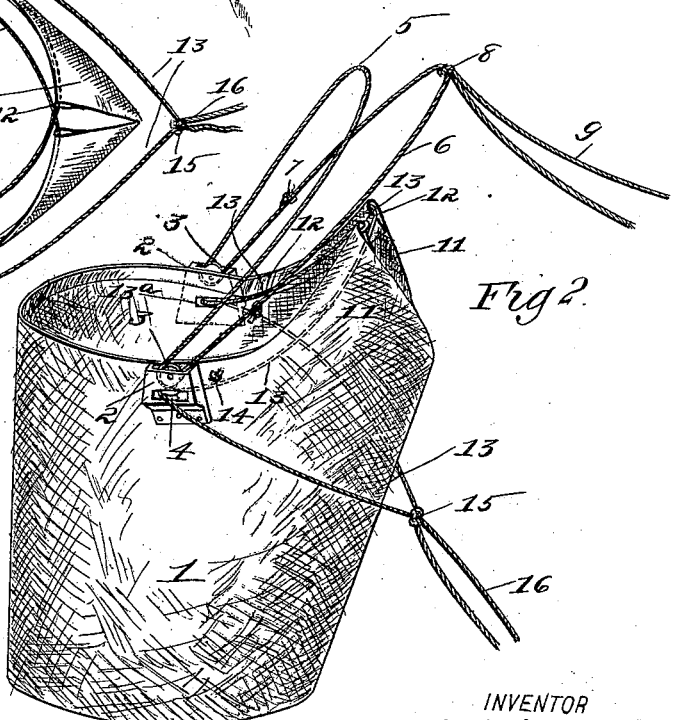

Figure 1 is a perspective view, drawn to a small scale, showing my improved nose or feed bag in position for use. Fig. 2 is a perspective view drawn to a larger scale; and Fig. 3 is a plan view of the device as shown in Fig. 2, the cord employed for supporting the bag in place on the horse's head being removed for the sake of clearness.

In the views, 1 represents the body of the bag, which may be constructed of canvas of the size and form usually imparted to such devices and provided at opposite sides of its upper portion with brackets 2, wherein are rotatably mounted an upper sheave or pulley 3 on a horizontal pintle and a lower sheave or pulley 4 on a vertical pintle, as clearly indicated in Fig. 2.

A cord of suitable length is passed around the pulleys 3 3 at opposite sides of the nose-bag, being formed into loops 5 and 6 of suitable length separated by knots 7, one of said loops, 5, being adapted to pass over the head of the horse, as indicated in Fig. 1, and the other loop, 6, being adapted to pass somewhat rearwardly behind the loop 5, where it is knotted at 8, as indicated in the drawings, and its rear portion 9 carried back and passed over the check-hook 10, as seen in Fig. 1. By this arrangement of the cord it will be seen that when the horse lowers his head in endeavoring to reach the feed at the bottom of the bag 1 the said bag will be raised slightly, owing to the peculiar arrangement of the loops and the connections with the check-hook, so as to bring the feed within easy reach of the horse.

At the rear part of the bag 1 the upper edge thereof is provided at its sides with extensions 11, of general triangular form, the upper edge of each of which is turned over, as indicated at 12, to form pockets adapted to receive draw-strings 13, the ends of which are carried through the sides of the bag 1, adjacent to the brackets 2, and knotted, as indicated at 14 in the drawings.

Each cord or draw-string 13 passes from its knotted end 14 first through one of the pockets 12 and then across the interior of the feed-bag, as indicated in Fig. 3, from the end of said pocket 12 to and through an opening 13ª, formed in the opposite side of the bag and adjacent to the bracket 2, around the pulley 4 and rearwardly, the cords or draw-strings 13 being knotted together at 15 behind the feed-bag and having their rear ends 16 adapted to be carried back and knotted, as indicated at 17, so as to be engaged by a hook 18, secured in any preferred way to the breast-collar of the harness.

By the arrangement of the cords 13 and their connection with the breast-collar of the harness, as above described, it will be seen that when the horse tosses his head the cords 13 will be tightened, so as to press tightly against the under side of the horse's jaw and close the space between the rear edges of the feed-bag 1 and the horse's head by drawing together the extensions 11 at the upper edge of the bag, thereby preventing any feed from being thrown from the bag.

The construction of the device, as above described, is extremely simple and inexpensive and effectually prevents the waste of feed by the horse tossing his head. The connection of the cords 13 at their rear ends makes it possible to adjust the position of the knot 17, so that the length of said cords may be conveniently regulated.

The extensions 11 will usually be provided with perforations to permit free entry of air when the extensions are drawn against the horse's head, and, if desired, said extensions may be formed separately and attached to the upper edges of the bag in any preferred way instead of being formed integrally with the bag, as herein shown.

Having thus described my invention, I claim as new and desire to secure by Letters Patent—

1. In a nose-bag, the combination of a bag having means for supporting it in position from the horse's head, sheaves at opposite sides of the bag, extensions at opposite sides of the rear upper edge of the bag, and draw-strings each connected at one end to one of said extensions and having its other end passed over one of the sheaves, said draw-strings each having its outer ends carried rearwardly and adapted for attachment to the breast-collar of the harness, substantially as set forth.

2. The combination of a bag provided with sheaves at opposite sides and having extensions at opposite sides of its rear upper edge, said extensions being provided with longitudinal pockets, and draw-strings each secured at one end to one side of the bag and extending through the pocket at the upper edge of one of the extensions and around the sheaves at the opposite side of the bag, said draw-strings having their outer ends carried rearwardly and adapted for attachment to the breast-collar of the harness, substantially as set forth.

3. In a nose-bag, the combination of a bag having sheaves at its opposite sides, a cord passed around the sheaves and formed into two loops each adapted to be passed over the head of the horse, a connection between the rear loop and the check-hook, an extension at the rear part of the bag, and a draw-string connected at one end to said extension, said draw-string passing over one of the sheaves on the bag and being connected to the harness of the horse, substantially as set forth.

CLEMENT E. BURBANK.

Witnesses:
J. D. CAPLINGER,
C. SEDGWICK.